(12) United States Patent
Kim (10) Patent No.: US 9,666,839 B2
(45) Date of Patent: May 30, 2017

(54) SECONDARY BATTERY (71) Applicant: Samsung SDI Co., Ltd., Yongin-si, Gyeonggi-do (KR)

(72) Inventor: Duk-Jung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 151 days.

(21) Appl. No.: 14/269,033

(22) Filed: May 2, 2014

(65) Prior Publication Data
US 2015/0140414 A1    May 21, 2015

(30) Foreign Application Priority Data

Nov. 15, 2013   (KR) .................. 10-2013-0139324

(51) Int. Cl.
| | |
|---|---|
| *H01M 2/38* | (2006.01) |
| *H01M 2/06* | (2006.01) |
| *H01M 2/22* | (2006.01) |
| *H01M 2/26* | (2006.01) |
| H01M 10/02 | (2006.01) |

(52) U.S. Cl.
CPC .............. *H01M 2/06* (2013.01); *H01M 2/22* (2013.01); *H01M 2/26* (2013.01); *H01M 2/38* (2013.01); *H01M 2/263* (2013.01); *H01M 10/02* (2013.01)

(58) Field of Classification Search
CPC ............ H01M 2/08; H01M 2/10; H01M 2/20; H01M 2/30
USPC ......................................... 429/163
See application file for complete search history.

(56) References Cited

U.S. PATENT DOCUMENTS

| | | | |
|---|---|---|---|
| 2006/0024568 A1* | 2/2006 | Lee .................. | H01M 2/14 429/130 |
| 2008/0038627 A1 | 2/2008 | Yamauchi et al. | |
| 2010/0310922 A1 | 12/2010 | Villarreal et al. | |
| 2011/0136000 A1* | 6/2011 | Moon et al. ............ | 429/163 |
| 2012/0171525 A1* | 7/2012 | Guen ................. | H01M 2/0275 429/53 |
| 2012/0237817 A1 | 9/2012 | Kim | |

(Continued)

FOREIGN PATENT DOCUMENTS

| | | |
|---|---|---|
| EP | 2 273 587 A1 | 1/2011 |
| EP | 2 490 282 A1 | 8/2012 |

(Continued)

OTHER PUBLICATIONS

EPO Search Report dated Feb. 23, 2015, for corresponding European Patent application 14172480.7, (6 pages).

(Continued)

*Primary Examiner* — James Lee
(74) *Attorney, Agent, or Firm* — Lewis Roca Rothgerber Christie LLP (57) ABSTRACT

A secondary battery including a case, at least one electrode assembly housed in the case, and a cap plate coupled to the case includes a terminal protruding through the cap plate, a collector between the cap plate and the electrode assembly electrically coupling the terminal and the electrode assembly, and an insulation member between the collector and the electrode assembly. The insulation member may include a flow passage between the collector and the insulation member configured to allow an electrolyte of the secondary batter to flow through.

17 Claims, 8 Drawing Sheets

(56) References Cited

U.S. PATENT DOCUMENTS

2012/0282502 A1*  11/2012  Kim .............................. 429/82
2013/0136976 A1   5/2013  Masuda et al.

FOREIGN PATENT DOCUMENTS

| EP | 2 551 940 A2 | 1/2013 |
| EP | 2 660 896 A1 | 11/2013 |
| KR | 10-2004-0037578 A | 5/2004 |
| KR | 10-2008-0096164 A | 10/2008 |
| KR | 10-2009-0063720 A | 6/2009 |
| KR | 10-2012-0106539 | 9/2012 |

OTHER PUBLICATIONS

KIPO Office Action dated Aug. 12, 2016, for corresponding Korean Patent Application No. 10-2013-0139324 (9 pages).
KIPO Registration Determination Certificate dated Feb. 28, 2017, for corresponding Korean Patent Application No. 10-2013-0139324 (2 pages).

* cited by examiner

SECONDARY BATTERY

CROSS-REFERENCE TO RELATED APPLICATION

This application claims priority to and the benefit of Korean Patent Application No. 10-2013-0139324, filed on Nov. 15, 2013, in the Korean Intellectual Property Office, the disclosure of which is incorporated herein in its entirety by reference.

BACKGROUND

1. Field

Aspects of the present invention relate to a secondary battery.

2. Description of the Related Art

Unlike primary batteries, which cannot be recharged, secondary batteries are rechargeable. Recently, high-power secondary batteries using a high-energy-density non-aqueous electrolyte have been developed. Low-capacity batteries in which one or up to several secondary batteries are connected and packaged are typically used in small portable electronic devices such as cellular phones or laptop computers, whereas battery packs in which at least several secondary batteries are connected in series or parallel are typically used in devices consuming a larger amount of electricity such as hybrid vehicles, electric vehicles, or electric bicycles.

Since secondary batteries are generally used for long periods of time through discharging and recharging, mechanical and electrical coupling of elements of the secondary batteries must be more stably maintained.

SUMMARY

One or more embodiments of the present invention relate to a secondary battery.

Additional aspects of embodiments of the present invention will be set forth, in part in the description which follows and, in part, will be apparent from the description, or may be learned by practice of the presented embodiments.

According to one or more embodiments of the present invention, a secondary battery includes a case, at least one electrode assembly housed in the case, a cap plate coupled to the case, a terminal protruding through the cap plate, a collector between the cap plate and the electrode assembly electrically coupling the terminal and the electrode assembly, and an insulation member between the collector and the electrode assembly, wherein the insulation member includes a flow passage between the collector and the insulation member configured to allow an electrolyte of the secondary battery to flow through.

In an embodiment, the flow passage of the insulation member may be sloped.

In an embodiment, the at least one electrode assembly may include a first electrode assembly and a second electrode assembly.

In an embodiment, the flow passage of the insulation member may be positioned between the first and second electrode assemblies.

According to an embodiment, the collector may include a first portion substantially parallel to the cap plate; and a second portion bent with respect to the first portion and connected to the electrode assembly.

In an embodiment, the insulation member may extend over a lower surface of the first portion of the collector.

In an embodiment, the insulation member may include a skirt extending along a length of the second portion of the collector.

In an embodiment, the first portion may be between the insulation member and the terminal.

In an embodiment, the secondary battery may further include a sealing member between the cap plate and the terminal configured to insulate the cap plate and the terminal from each other.

In an embodiment, the insulation member may be coupled to the terminal.

According to one or more embodiments of the present invention, a secondary battery includes a case, at least one electrode assembly housed in the case, a cap plate coupled to the case, a terminal protruding through the cap plate, a collector between the cap plate and the electrode assembly, the collector having a first portion parallel to the cap plate and a second portion bent with respect to the first portion, and coupling the terminal and the electrode assembly, and an insulation member extending over a lower surface of the first portion of the collector, and including a flow passage between the insulation member and the lower surface of the first portion of the collector configured to allow liquid electrolyte of the secondary battery to flow through.

In an embodiment, the flow passage may include a protrusion protruding between a region of the insulation member and the lower surface of the first portion of the collector.

In an embodiment, the electrode assembly may include a first electrode assembly and a second electrode assembly, and the region of the insulation member may be between the first and second electrode assemblies.

In an embodiment, the region of the insulation member may be coupled to respective upper surfaces of the first and second electrode assemblies.

In an embodiment, the flow passage may have a slope.

In an embodiment, the insulation member may include a skirt extending along a length of the second portion of the collector.

In an embodiment, the insulation member may be coupled to the terminal.

In an embodiment, the secondary battery may further include a sealing member between the cap plate and the terminal.

In an embodiment, one of the collector and the terminal may include a fixing hole, and the other of the collector and the terminal may include a fixing protrusion configured to couple with the fixing hole.

BRIEF DESCRIPTION OF THE DRAWINGS

These and/or other aspects of embodiments of the present invention will become apparent and more readily appreciated from the following description of the embodiments, taken in conjunction with the accompanying drawings, in which.

DETAILED DESCRIPTION

Reference will now be made in detail to embodiments, examples of which are illustrated in the accompanying drawings. Effects and features of the embodiments, and implementation methods thereof, will be clarified through the following descriptions given with reference to the accompanying drawings. The embodiments may have different forms and should not be construed as being limited to the descriptions set forth. As used herein, the term "and/or" includes any and all combinations of one or more of the associated listed items. Expressions such as "at least one of," when preceding a list of elements, modify the entire list of elements and do not modify the individual elements of the list.

Hereinafter, the embodiments of the present invention will be described in detail with reference to the accompanying drawings. In the drawings, like reference numerals denote like elements, and overlapping descriptions thereof will be omitted.

In the following descriptions of the embodiments, although the terms "first and second" are used to describe various elements, these elements should not be limited by these terms. These terms are only used to distinguish one element from another element. In the following descriptions of the embodiments, the terms of a singular form may include plural forms unless explicitly referred to in the contrary. In the following descriptions of the embodiments, the meaning of the terms "include," "comprise," "including," or "comprising," specifies a property, a region, a fixed number, a step, a process, an element, and/or a component but does not exclude other properties, regions, fixed numbers, steps, processes, elements, and/or components.

It will be understood that when a film, a region, or an element is referred to as being "above" or "on" another film, region, or element, it can be directly on the other film, region, or element, or intervening films, regions, or elements may also be present.

In the drawings, the sizes of elements may be exaggerated for clarity. For example, in the drawings, the size or thickness of each element may be arbitrarily shown for illustrative purposes, and, thus, the present invention should not be construed as being limited thereto.

The order of processes explained in one embodiment may be changed in a modification of the embodiment or in another embodiment. For example, two processes sequentially explained may be performed substantially at the same time or in the reverse of the explained order.

Figure 1:
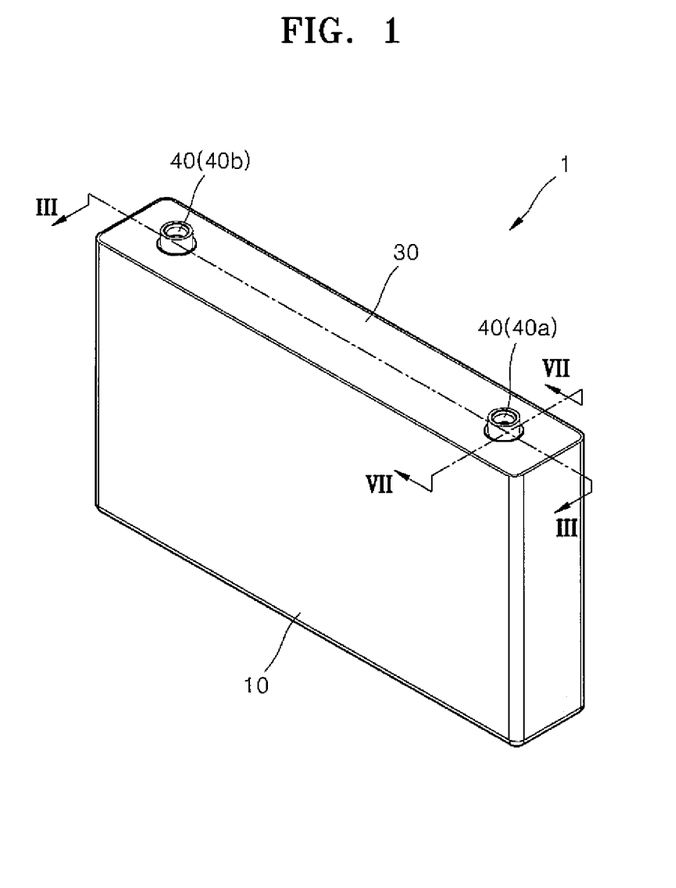
FIG. 1 is a perspective view illustrating a secondary battery according to an embodiment of the present invention.
Figure 2:
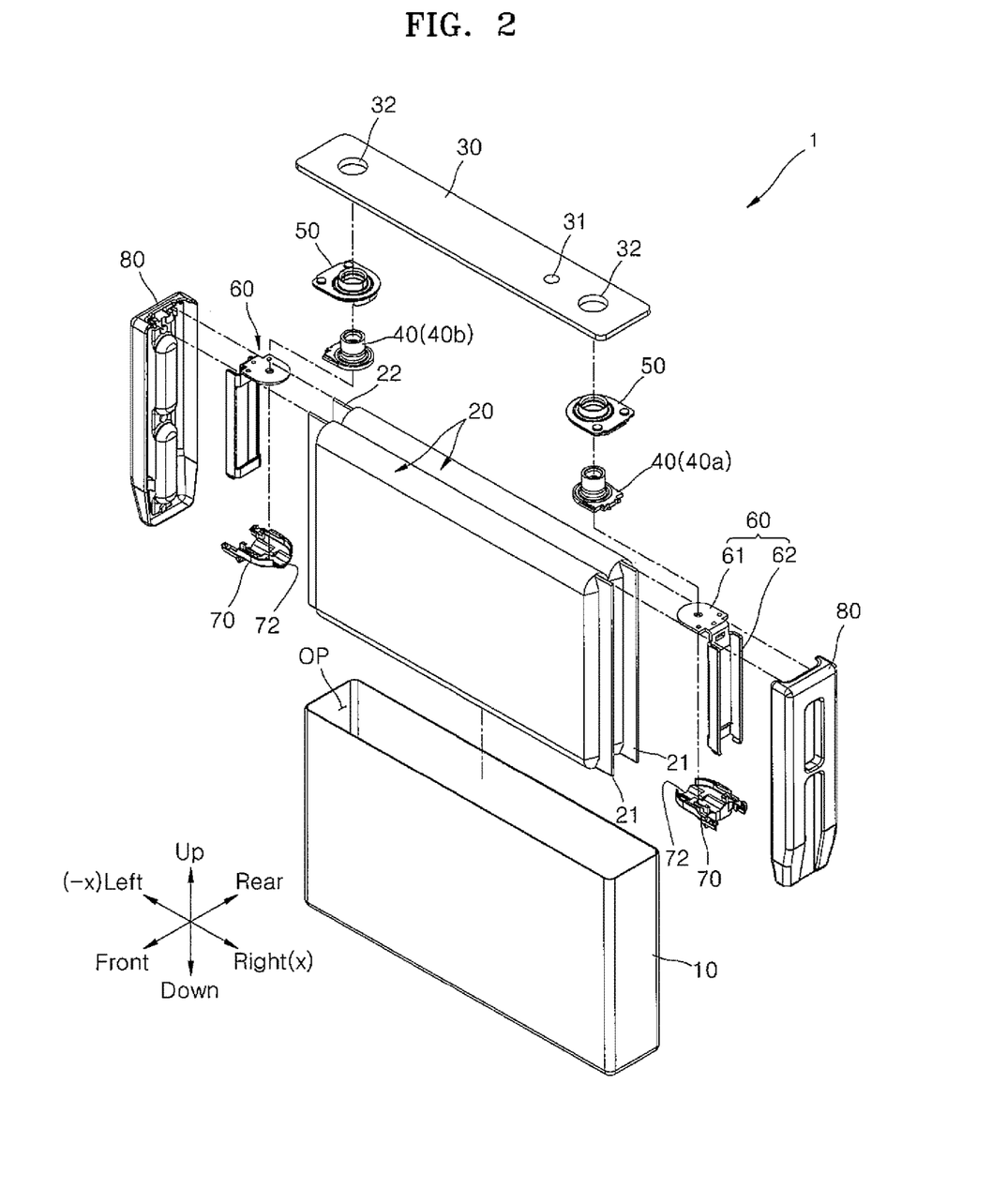
FIG. 2 is an exploded perspective view of the secondary battery of FIG. 1.

FIG. 1 is a perspective view illustrating a secondary battery according to an embodiment of the present invention; FIG. 2 is an exploded perspective view of the secondary battery of FIG. 1; and FIG. 3 is a cross-sectional view of the secondary battery taken along line of FIG. 1.

Figure 3:
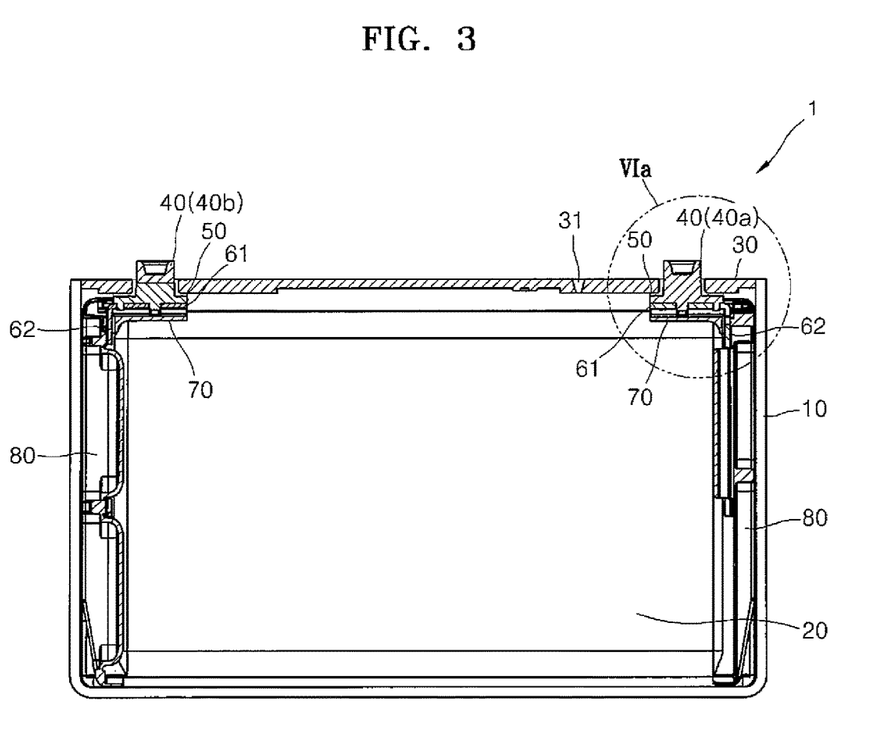
FIG. 3 is a cross-sectional view of the secondary battery taken along line III-III of FIG. 1.

Referring to FIGS. 1 through 3, a secondary battery 1 according to an embodiment of the present invention may include a case 10, at least one electrode assembly 20 housed in the case 10, a cap plate 30, terminals 40, sealing members 50, collectors 60 coupling the terminals 40 and the electrode assemblies 20, insulation members 70, and retainers 80.

The case 10, according to an embodiment, includes an opening OP configured to receive the at least one electrode assembly 20. For example, the case 10 may have an approximate hexahedron shape, and the opening OP may be defined at an upper or top side of the case 10. To ensure the strength of the case 10, the case 10, according to an embodiment, may be formed of a metallic material. For example, the case 10 may be an aluminum or an aluminum alloy.

At least one electrode assembly 20 may be positioned in the case 10 through the opening OP. Each electrode assembly 20 may include a positive electrode plate, a negative electrode plate, and a separator therebetween. The negative electrode plate may include a coating portion having a foil such as copper foil coated with a negative electrode active material, and a non-coating portion of the foil not coated with the negative electrode active material. The positive electrode plate may include a coating portion having a foil such as aluminum foil coated with a positive electrode active material, and a non-coating portion of the foil not coated with the positive electrode active material.

The negative electrode plate having the coating portion and the non-coating portion, the separator, and the positive electrode plate having the coating portion and the non-coating portion may be sequentially stacked and wound in the form of a jelly roll to form each of the electrode assemblies 20, according to an embodiment. In this embodiment, the electrode assemblies 20 may be configured such that the non-coating portions of the negative electrode plates and the non-coating portions of the positive electrode plates are exposed in opposite directions, for example, in an x-axis direction and a negative x-axis (−x) direction, as indicated in FIG. 2. In an embodiment, the non-coating portions of the negative electrode plates exposed in the x-axis direction are the negative electrodes 21 of the electrode assembly 20, and the non-coating portions of the positive electrode plates are the positive electrodes 22 of the electrode assembly 20.

In the embodiment shown in FIG. 2, the negative electrode plate, the separator, and the positive electrode plate are stacked and wound to form each of the electrode assemblies 20. However, the embodiments of the present invention are not limited thereto. In another embodiment, a negative electrode plate, a separator, and a positive electrode plate may be sequentially stacked to form a stacking type electrode assembly, for example.

The cap plate 30, according to an embodiment, is coupled to the case 10 at the opening OP. Like the case 10, the cap plate 30, according to an embodiment, may be formed of a metallic material such as an aluminum or an aluminum alloy. The cap plate 30 may include an electrolyte inlet to inject electrolyte therethrough. In some embodiments, after placing the at least one electrode assembly 20 in the case 10 and sealing the opening OP of the cap plate 30, electrolyte may be injected into the case 10 through the electrolyte inlet. After injecting electrolyte in these embodiments, the electrolyte inlet may be closed with a plug 31.

The terminals 40, according to an embodiment, protrude upward through the cap plate 30. The terminals 40, according to this embodiment, include a first terminal 40a functioning as a negative electrode of the secondary battery 1 and a second terminal 40b functioning as a positive electrode of the secondary battery 1. The terminals 40 may penetrate respective holes 32 in the cap plate 30 to be exposed to an outer surface of the cap plate 30.

The sealing members 50 may be positioned between the cap plate 30 and each of the terminals 40, and may be formed of an insulation material. The sealing members 50, according to an embodiment, may fill small gaps between the cap plate 30 and the terminals 40 and may insulate the cap plate 30 and the terminals 40 from each other.

For example, since the first terminal 40a (i.e., the negative terminal) and the second terminal 40b (i.e., the positive terminal) penetrate the cap plate 30 according to an embodiment, the electrolyte may leak through a small gap formed between the outside of the negative terminal 40a and the hole 32 of the cap plate 30 or the outside of the positive terminal 40b and the hole 32 of the cap plate 30. To prevent this, sealing members 50 may be positioned between the cap plate 30 and each of the terminals 40 to fill the small gaps and to seal the holes 32 from leaking. In addition, since the negative terminal 40a, the positive terminal 40b, and the cap plate 30 are formed of conductive metallic materials, according to an embodiment, the sealing members 50, formed of an insulation material, may electrically insulate the negative terminal 40a and/or the positive terminal 40b from the cap plate 30.

The collectors 60 according to an embodiment may electrically couple the terminals 40 to respective electrode assemblies 20. Each of the collectors 60 may include a first portion 61 substantially parallel to the cap plate 30 and a second portion 62 bent with respect to the first portion 61. The first portion 61 of each collector 60 may contact a lower surface of the respective terminal 40 for coupling to the terminals 40, and the second portion 62 of each collector 60 may contact the non-coating portions of the respective electrode assemblies 20 (in other words, the negative electrodes 21 and the positive electrodes 22 of each of the electrode assemblies 20) for coupling with these respective electrode assemblies 20. In an embodiment, the second portion 62 of each of the collectors 60 may be electrically coupled to the negative electrode 21 and the positive electrode 22 of the electrode assemblies 20 by welding.

In an embodiment, the number of the electrode assemblies 20 is two. In this embodiment, each of the collectors 60 may include two second portions 62 such that the second portion 62 may contact each of the negative electrode 21 and the positive electrode 22 of each of the electrode assemblies 20. The number of second portions 62 of the collectors 60 may vary according to the number of the electrode assemblies 20.

The insulation members 70, according to an embodiment, are positioned between the electrode assemblies 20 and the collectors 60 to electrically insulate the electrode assemblies 20 and the collectors 60. The insulation members 70 may be placed under the collectors 60 to cover lower surfaces of the collectors 60. For example, the insulation members 70 may cover lower surfaces of the first portion 61 of each collector 60.

Figure 4:
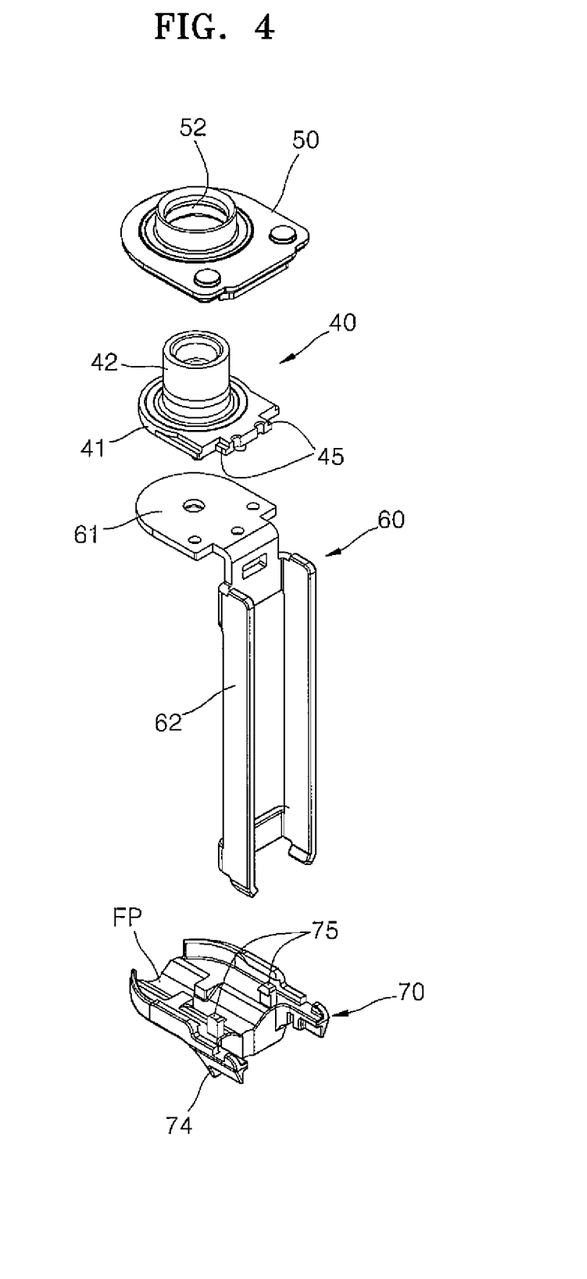
FIG. 4 is an exploded top perspective view illustrating a terminal, a collector, and an insulation member of the secondary battery depicted in FIG. 1.

The insulation members 70 according to an embodiment provide flow passages FP (as shown in FIG. 4) through which the electrolyte may flow. For example, regions of the insulation members 70 may include protrusions 72 protruding downward, and gaps (flow passages FP) may form between the first portions 61 of the collectors 60 and the protrusions 72. Since the insulation members 70 include the flow passages FP, the electrolyte, which is liquid, may flow through the flow passages FP and participate in chemical reactions of the secondary battery 1, rather than stagnating in the small gaps that may form between the collectors 60 and the insulation members 70.

If the liquid electrolyte permeates into and stagnates in the small gaps between the insulation members 70 and the lower surfaces of the first portions 61 of the collectors 60, the terminals 40 contacting the collectors 60 and electrically coupled to the cap plate 30 may short circuit. However, according to an embodiment of the present invention, since the insulation members 70 have flow passages FP for the electrolyte liquid to flow though, an external short circuit as described above may be prevented.

The retainers 80 may electrically insulate the collectors 60 from the case 10 and may fix the positions of the collectors 60. The retainers 80 may be positioned between the collectors 60 and inner sides of the case 10 and may fix the positions of electrodes of the electrode assemblies 20, for example, the negative and positive electrodes 21 and 22 exposed at both sides of each of the electrode assemblies 20.

Hereinafter, the structure of the insulation members 70 will be described in more detail with reference to FIGS. 4 through 7.

Figure 5:
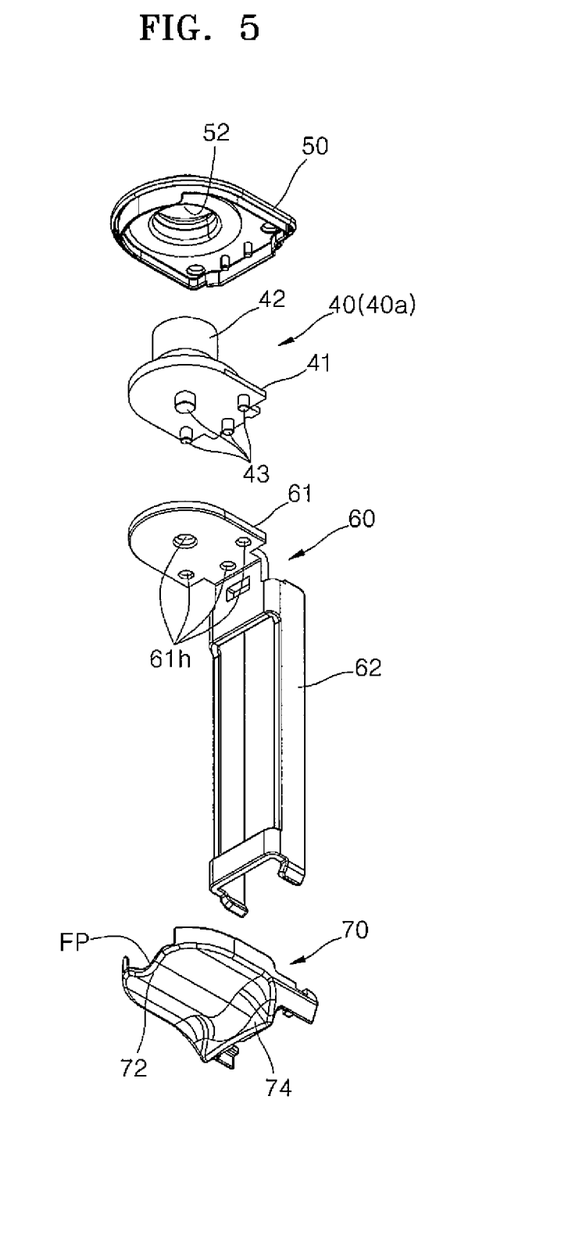
FIG. 5 is an exploded bottom perspective view of the terminal, the collector, and the insulation member depicted in FIG. 4.
Figure 6A:
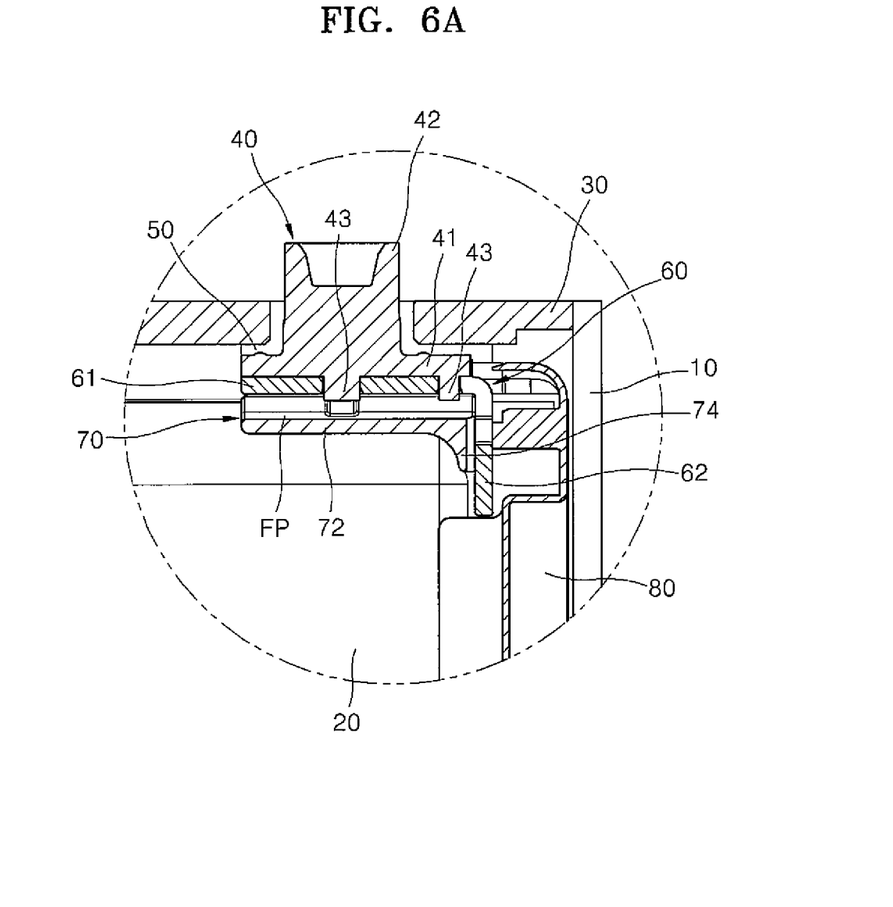
FIG. 6A is an enlarged cross-sectional view illustrating portion VIa of the secondary battery shown in FIG. 3.
Figure 6B:
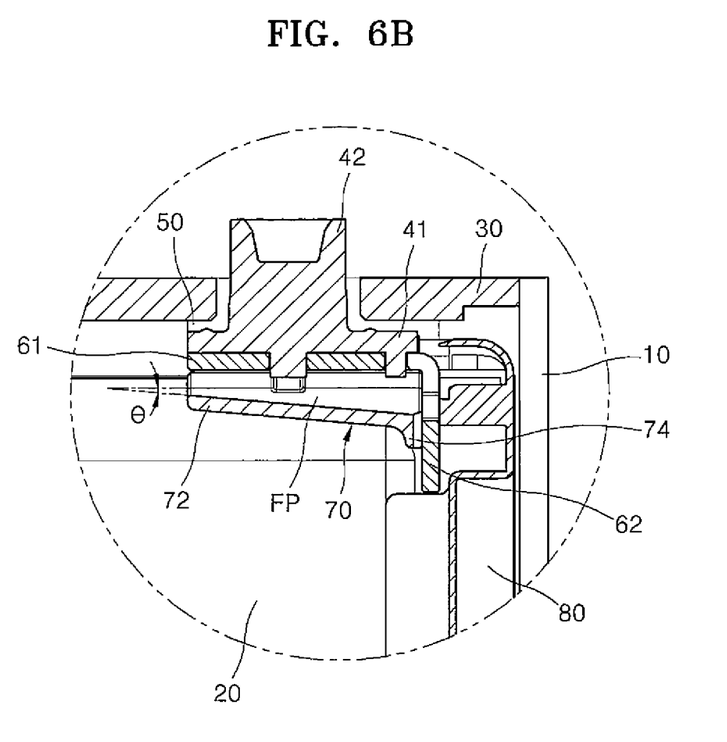
FIG. 6B is a view illustrating another embodiment of the enlarged cross-sectional view of a modified portion VIa illustrated in FIG. 6A.

FIG. 4 is an exploded top perspective view illustrating the the terminal 40, the collector 60, and the insulation member 70, and FIG. 5 is an exploded bottom perspective view of the terminal 40, the collector 60, and the insulation member 70 depicted in FIG. 4. FIG. 6A is an enlarged cross-sectional view illustrating portion VIa of the secondary battery shown in FIG. 3, and FIG. 6B is a view illustrating another embodiment of the enlarged cross-sectional view of a modified portion VIa illustrated in FIG. 6A.

Because the first terminal 40a (i.e., a negative electrode) of the secondary battery 1 has the same structure as the second terminal 40b (i.e., a positive electrode) of the secondary battery 1, the structures of the sealing member 50, the terminal 40, the collector 60, and the insulation member 70 described below with reference to FIGS. 4 through 7 correspond to the structures of the sealing members 50, the first and second terminals 40a and 40b, the collectors 60, and the insulation members 70 located at each side of the secondary battery 1.

Referring to FIGS. 4 and 5, the terminal 40 may include a flange 41 and a pillar 42 protruding up from the flange 41. The flange 41, according to an embodiment, extends approximately perpendicular to the pillar 42 to support the terminal 40 under the cap plate 30.

In an embodiment, at least one fixing protrusion 43 is positioned on a lower side of the flange 41. The fixing protrusion 43 may be inserted into a fixing hole 61h (described below) of the collector 60. According to this embodiment, the terminal 40 and the collector 60 may be both mechanically and electrically coupled when the fixing protrusion 43 of the terminal 40 is coupled to the fixing hole 61h of the collector 60.

The sealing member 50 may be positioned on the pillar 42, according to an embodiment. In an embodiment, the sealing member 50 may include a penetration hole 52, and the pillar 42 may be inserted through the penetration hole 52 of the sealing member 50 and the hole 32 (as shown in FIG. 2) of the cap plate 30, such that the pillar 42 may be exposed to an exterior of the cap plate 30.

In an embodiment, the collector 60 may include the first portion 61 substantially parallel to the cap plate 30 and the second portion 62 bent with respect to the first portion 61. The second portion 62 according to this embodiment may be bent in a direction substantially perpendicular to the first portion 61.

As described above, the first portion 61, according to this embodiment, includes the fixing hole 61h to which the fixing protrusion 43 of the terminal 40 may be coupled. In this embodiment, the fixing protrusion 43 is through the fixing hole 61h, bringing the first portion 61 into direct contact with the flange 41, and, thus, electrically coupling the first portion 61 to the flange 41. The second portion 62 according to an embodiment may extend veritcally and may be welded to the electrode assemblies 20. According to an embodiment, the second portion 62 may be welded to the negative electrode 21 and/or the positive electrode 22 of each of the electrode assemblies 20.

In an embodiment where the first portion 61 of each collector 60 is brought into contact with a terminal 40 and the second portion 62 of each collector 60 is welded to the electrode assemblies 20, each collector 60 may electrically couple a respective terminal 40 with the electrode assemblies 20. The insulation member 70 in these embodiment extends over a lower surface of the collector 60. For example, in an embodiment, the insulation member 70 may extend over a lower surface of the first portion 61 of the collector 60.

The insulation member 70 may include hook protrusions 75. The hook protrusions 75 may be coupled to catch jaws 45 on the terminal 40. In these embodiments, the hook protrusions 75 are coupled to the catch jaws 45 such that the insulation member 70 may fix the position of the collector 60. In an embodiment where the insulation member 70 extends over the lower surface of the collector 60 (for example, the lower surface of the first portion 61 of the collector 60), the insulation member 70 may electrically insulate the collector 60 from the electrode assemblies 20.

In an embodiment, the hook protrusions 75 on the insulation member 70 may be coupled to the catch jaws 45 on the terminal 40. However, the embodiments of the present invention are not limited thereto. For example, in another embodiment, the sealing member 50 may include grooves, and the hook protrusions 75 may be coupled to the grooves. In this embodiment, the shapes of the hook protrusions 75 are not limited to those shown in FIG. 4.

The insulation member 70 according to an embodiment may include a skirt 74 extending along a length of the second portion 62 of the collector 60. The skirt 74 may support a portion of the second portion 62 bent with respect to the first portion 61. In these embodiments, the second portion 62 may be prevented from bending to a certain angle or greater than a second angle when an external force (for example, an external impact) is applied, or the first portion 61 may be prevented from fracturing due to the application of an excessive external force.

Referring to FIGS. 4 and 6A, a region of the insulation member 70 may protrude downward, forming a gap between the first portion 61 of the collector 60 and the insulation member 70. In an embodiment, the gap formed between a region of the insulation member 70 including the protrusion 72 and the first portion 61 of the collector 60 may 72 function as a flow passage FP to allow flow of the electrolyte therethrough.

In these embodiments, the liquid electrolyte solution may be prevented from stagnating between the first portion 61 of the collector 60 and the insulation member 70 after being injected through the electrolyte inlet or when the secondary battery 1 is in operation, flowing, instead, through the flow passage FP, and, thus, preventing an external short circuit.

Referring to FIG. 6B illustrating another embodiment, the protrusion 72 of the insulation member 70 may be sloped in a certain direction, for example, in a direction of flow for the flow passage FP. In an embodiment where the protrusion 72 of the insulation member 70 is sloped at an oblique angle θ, the electrolyte flowing in the flow passage FP is assisted by gravity in its flow through the flow passage FP. Therefore, permeation of the electrolyte between the collector 60 and the insulation member 70 may be prevented more effectively. In other words, stagnation of the electrolyte between the collector 60 and the insulation member 70 may be prevented more effectively in an embodiment where the insulation member 70 is sloped at an oblique angle θ.

The protrusion 72 on the insulation member 70, according to an embodiment, may provide the flow passage FP described above, and may be useful to prevent movement of the electrode assemblies 20.

Figure 7:
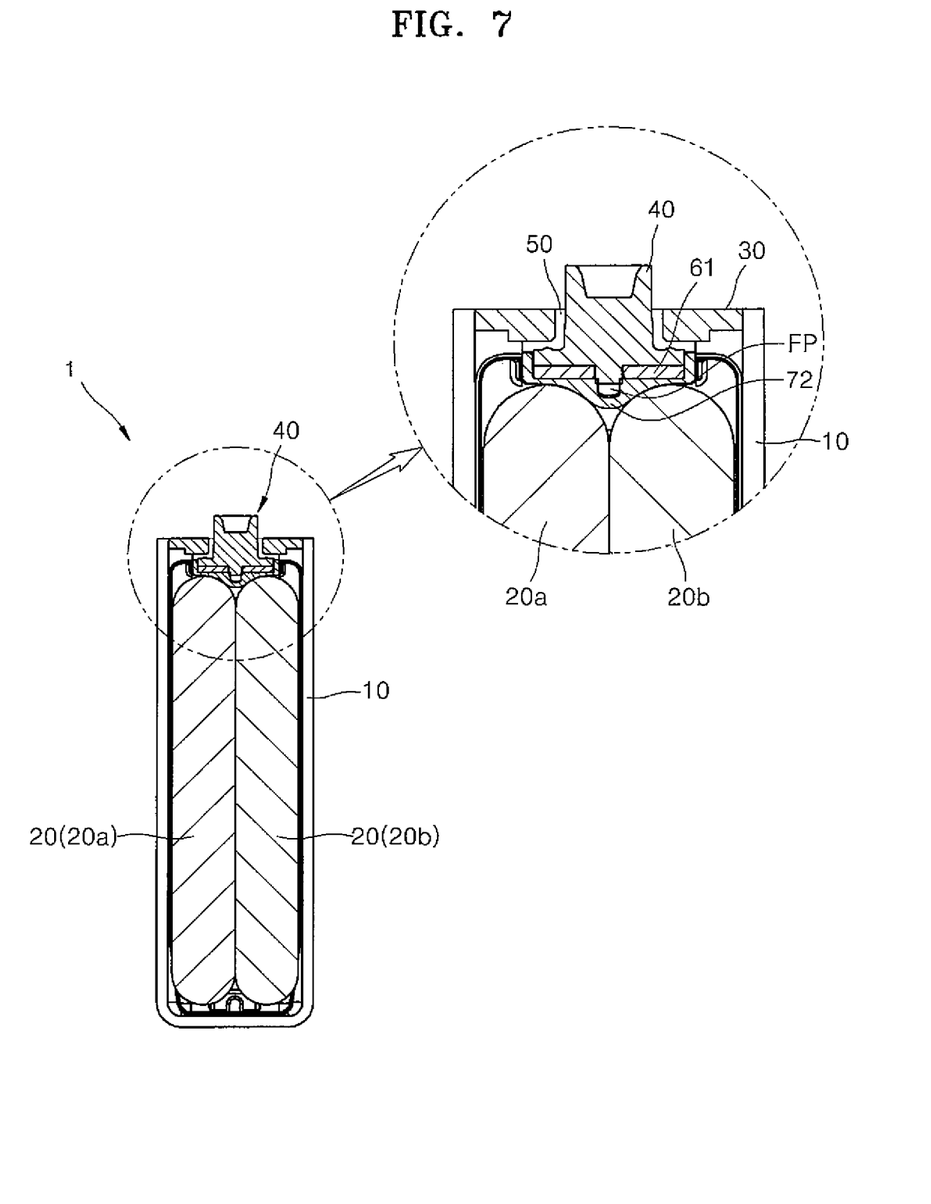
FIG. 7 is a cross-sectional view and an enlarged view of the secondary battery taken along line VII-VII of FIG. 1.

FIG. 7 is a cross-sectional view and an enlarged view of the secondary battery taken along line VII-VII of FIG. 1.

Referring to the embodiment shown in FIG. 7, a plurality of electrode assemblies 20 are shown, and the protrusion 72 may be positioned between the electrode assemblies 20 adjacent to each other, so as to prevent movement of the electrode assemblies 20.

For example, the protrusion 72 may be at a position corresponding to a caved region between a first electrode assembly 20a and a second electrode assembly 20b that are adjacent to each other and may contact upper surfaces of the first and second electrode assemblies 20a and 20b. In this embodiment, movement of the first and second electrode assemblies 20a and 20b in the case 10 may be prevented.

As described above, according to one or more of the above embodiments of the present invention, electrical and mechanical coupling of elements of the secondary battery 1 may be stably maintained.

It should be understood that the exemplary embodiments described therein should be considered in a descriptive sense only and not for purposes of limitation. Descriptions of features or aspects within each embodiment should be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:
1. A secondary battery comprising:
   a case;
   at least one electrode assembly housed in the case;
   a cap plate coupled to the case;
   a terminal protruding through the cap plate;
   a collector between the cap plate and the at least one electrode assembly electrically coupling the terminal and the at least one electrode assembly; and
   an insulation member between the collector and the at least one electrode assembly, the insulation member directly contacting the terminal;
   wherein a base of the insulation member comprises a flow passage between the collector and the insulation member, the flow passage being sloped at an angle with respect to the cap plate such that a liquid electrolyte of the secondary battery can flow along the flow passage due to gravity when the battery is oriented right side up.
2. The secondary battery of claim 1, wherein the at least one electrode assembly comprises a first electrode assembly and a second electrode assembly.
3. The secondary battery of claim 2, wherein the flow passage of the insulation member is between the first and second electrode assemblies.
4. The secondary battery of claim 1, wherein the collector comprises:
   a first portion substantially parallel to the cap plate; and a second portion bent with respect to the first portion and connected to the at least one electrode assembly.

5. The secondary battery of claim 4, wherein the insulation member extends over a lower surface of the first portion of the collector.

6. The secondary battery of claim 4, wherein the insulation member comprises a skirt extending along a length of the second portion of the collector.

7. The secondary battery of claim 4, wherein the first portion is between the insulation member and the terminal.

8. The secondary battery of claim 1, further comprising a sealing member between the cap plate and the terminal configured to insulate the cap plate and the terminal from each other.

9. The secondary battery of claim 1, wherein the insulation member is coupled to the terminal.

10. A secondary battery comprising:
a case;
at least one electrode assembly housed in the case;
a cap plate coupled to the case;
a terminal protruding through the cap plate;
a collector between the cap plate and the at least one electrode assembly, the collector comprising a first portion parallel to the cap plate and a second portion bent with respect to the first portion, and coupling the terminal and the at least one electrode assembly; and
an insulation member extending over a lower surface of the first portion of the collector, wherein an entire base of the insulation member defines a flow passage between the insulation member and the lower surface of the first portion of the collector configured to allow a liquid electrolyte of the secondary battery to flow therethrough, and wherein the flow passage has a groove extending along the entire base, the groove being recessed towards the at least one electrode assembly.

11. The secondary battery of claim 10, wherein the at least one electrode assembly comprises a first electrode assembly and a second electrode assembly, and a region of the insulation member is between the first and second electrode assemblies.

12. The secondary battery of claim 11, wherein the region of the insulation member is coupled to respective upper surfaces of the first and second electrode assemblies.

13. The secondary battery of claim 10, wherein the flow passage is sloped.

14. The secondary battery of claim 10, wherein the insulation member comprises a skirt extending along a direction of the second portion of the collector.

15. The secondary battery of claim 10, wherein the insulation member is coupled to the terminal.

16. The secondary battery of claim 10, further comprising a sealing member between the cap plate and the terminal.

17. The secondary battery of claim 10, wherein one of the collector and the terminal comprises a fixing hole, and the other of the collector and the terminal comprises a fixing protrusion configured to couple with the fixing hole.

* * * * *